(12) United States Patent  
McGinn

(10) Patent No.: US 9,223,143 B1  
(45) Date of Patent: Dec. 29, 2015

(54) VOLUMETRIC FILM DISPLAY SYSTEMS

(71) Applicant: Colin McGinn, Garland, TX (US)

(72) Inventor: Colin McGinn, Garland, TX (US)

( * ) Notice: Subject to any disclaimer, the term of this patent is extended or adjusted under 35 U.S.C. 154(b) by 0 days.

(21) Appl. No.: 14/326,389

(22) Filed: Jul. 8, 2014

Related U.S. Application Data

(60) Provisional application No. 61/844,859, filed on Jul. 11, 2013.

(51) Int. Cl.
*G03B 25/00* (2006.01)
*G02B 27/22* (2006.01)
*G03B 23/12* (2006.01)
*G03B 1/24* (2006.01)

(52) U.S. Cl.
CPC .............. *G02B 27/2271* (2013.01); *G03B 1/24* (2013.01); *G03B 23/125* (2013.01); *G03B 25/00* (2013.01)

(58) Field of Classification Search
USPC ......... 352/62, 87, 101, 102, 129, 239, 50, 58, 352/126, 86; 353/7, 109; 359/469, 468, 359/467; 40/362, 364
See application file for complete search history.

(56) References Cited

U.S. PATENT DOCUMENTS

| | | | |
|---|---|---|---|
| 1,014,365 A | | 1/1912 | Bourgin |
| 3,104,483 A | * | 9/1963 | Thompson et al. ............ 40/364 |
| 3,301,128 A | * | 1/1967 | Brandt et al. ................... 353/69 |
| 3,924,941 A | * | 12/1975 | Smith et al. ................. 352/78 R |
| 4,116,533 A | * | 9/1978 | Nerlich ......................... 359/469 |
| 4,326,772 A | * | 4/1982 | Hausherr ..................... 359/467 |
| 5,171,038 A | | 12/1992 | Bowler |
| 5,760,874 A | | 6/1998 | Rudnick |
| 5,870,170 A | * | 2/1999 | Pope ............................. 352/101 |
| 5,905,564 A | * | 5/1999 | Long ............................... 352/98 |
| 8,373,842 B1 | | 2/2013 | Seder |
| 2003/0200682 A1 | * | 10/2003 | Andrade ......................... 40/364 |
| 2009/0141241 A1 | | 6/2009 | Buyssens |

\* cited by examiner

*Primary Examiner* — William C Dowling  
(74) *Attorney, Agent, or Firm* — RG Patent Consulting, LLC; Rachel Gilboy

(57) ABSTRACT

An apparatus for watching movies in 3D having a belt feeding 3D volumetric objects comprising singular sequences for viewing a movie strip in 3D and thus eliminating the need for wearing 3D glasses to enjoy a movie in three dimensions.

17 Claims, 5 Drawing Sheets

VOLUMETRIC FILM DISPLAY SYSTEMS

CROSS-REFERENCE TO RELATED APPLICATION

The present application is related to and claims priority from prior provisional application Ser. No. 61/844,859, filed Jul. 11, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of film and more specifically relates to a system and method for providing a 3D movie viewing experience without the need for wearing 3D glasses.

2. Description of the Related Art

Film and cinema are a beloved activity that many people enjoy. Since inception, movie goers continuously flock to movie theaters to watch movies and short films. A more modern development in movie technology is three dimensional movies (3D). Movie lovers who want to experience a movie fully and completely may pay a little more than the regular ticket price to enjoy graphics that "pop out of the screen".

3D animation is an increasingly popular form of entertainment. However, traditional 3D movies requires a user to wear cumbersome glasses. Viewers also generally have to remain in a certain area and are limited to specific vantage points while viewing 3D movies.

Conventionally, 3D movies require the movie watcher to wear a pair of 3D glasses. In its early stages, 3D glasses were typically made of paper or cardboard and included a flimsy 3D lens enabling the movie watcher to enjoy 3D graphics. Nowadays, 3D glasses are made of plastic and are designed to be more comfortable to wear. However, no amount of "comfort" can ever replace not having to wear 3D glasses to enjoy a movie in 3D.

Various attempts have been made to solve the above-mentioned problems such as those found in U.S. Pub. No. 2009/0141241 to Ryan C. Buyssens, U.S. Pat. No. 8,373,842 to Rufus Butler Seder, U.S. Pat. No. 5,870,170 to Ovid Pope, U.S. Pat. No. 5,760,874 to Michael I. Rudnick, U.S. Pat. No. 1,014,365 to Charles N. Bourgin, and U.S. Pat. No. 5,171,038 to Kevin M. Bowler. This art is representative of current 3D movie technology. None of the above inventions and patents, taken either singly or in combination, is seen to describe the invention as claimed.

Ideally, a volumetric movie display system should provide a belt fed 3D stop motion-like display, where many objects slightly different from one another may travel around a belt fed box with only one object being viewed at the top through a hole, such that this object will appear to be moving and causing a 3D appearance on a screen, and, yet would operate reliably and be manufactured at a modest expense. Thus, a need exists for a reliable volumetric movie display system to avoid the above-mentioned problems.

BRIEF SUMMARY OF THE INVENTION

In view of the foregoing disadvantages inherent in the known 3D movie art, the present invention provides a novel volumetric movie display system (means). The general purpose of the present invention, which will be described subsequently in greater detail, is to provide a system and method to watch movies in 3D without having to wear special 3D glasses.

The volumetric movie display system may provide an innovative way to view 3D animation. It may enable a user to watch 3D movies without having to wear special glasses. The device may further allow the user to view 3D motion from all angles. The present invention utilizes actual three dimensional objects to eliminate the limitations of traditional methods.

A volumetric movie display system is disclosed herein in a preferred embodiment comprising a 3D movie display assembly and a 3D movie strip. The 3D movie display assembly may comprise a housing, a first-shaft, a second-shaft, a first-bearing, a second-bearing, a motor, a first-sprocket, a second-sprocket, a chain comprising a roller chain (the roller chain comprising a plurality of links), a computer processor for controlling the motor that controls the first-sprocket and the second-sprocket, an illumination source (preferably comprising a plurality of lights and alternatively at least one laser or projector), and a power supply (powerer or the like.)

The 3D movie strip comprises a plurality of sequentially spaced 3D volumetric objects. The volumetric movie display system may comprise the 3D movie display assembly and the 3D movie strip in functional combination. The 3D movie display assembly may comprise the housing, the first-shaft, the second-shaft, the first-bearing, the second-bearing, the first-sprocket, the second-sprocket, the chain, the computer processor, the illumination source, the power supply, and the projector. The 3D movie strip may comprise the plurality of sequentially spaced 3D volumetric objects.

The 3D movie strip is able to be rotated by the first-sprocket and the second-sprocket. The first-sprocket and the second-sprocket are mounted on the first-shaft and the second-shaft, on the first-bearing and the second-bearing, respectively. The first-shaft and the second-shaft are connected to the power supply, the first-bearing is mounted on the first-shaft, and the second-bearing is mounted on the second-shaft. The first-sprocket is mounted on the first-bearing and the second-sprocket is mounted on the second-bearing. Other shaft to sprocket coupling means may be used. The first-sprocket is turned by the power supply (via the first shaft being turned) causing the roller chain to be rotated, the chain rotated by the first-sprocket causes the second-sprocket to turn and guide the chain as it is rotated. Each link of the plurality of links of the roller chain comprises a single 3D volumetric object that is sequentially spaced.

The illumination source comprising the plurality of lights is synchronized so that the plurality of lights will blink (strobe) when the 3D volumetric object is in view. The 3D movie display assembly comprises an IR sensor that counts a plurality of teeth on the chain. The IR sensor flashes at a consistent interval that corresponds to a time when the 3D volumetric object is in a viewable position, and a rotation of the chain at a 3D movie producing speed is structured and arranged to make the plurality of sequentially spaced 3D volumetric objects of the 3D movie strip to appear as a 3D motion picture. The illumination source comprising the plurality of lights is useful for illuminating the 3D motion picture such that the 3D motion picture is able to be viewed by the user from a full range of vantage points without the use of specialty 3D glasses.

A kit including: the 3D movie display assembly, the 3D movie strip, and a set of user instructions is also disclosed.

A method of using a volumetric movie display system is described herein comprising the steps of: providing a 3D film strip comprising a plurality of 3D volumetric objects, feeding the 3D movie strip by connecting the 3D movie strip to a chain of a 3D movie display assembly, and projecting in three-dimensions the 3D movie strip to be viewed by a user.

The present invention holds significant improvements and serves as a volumetric movie display system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, volumetric film display systems, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a 3D movie display system and method and more particularly to a volumetric movie display systems as used to improve the ability to watch and enjoy 3D movies from any vantage point.

Generally speaking, volumetric movie display systems 100 may comprise a belt-fed 3D display. The invention may comprise a container with a mounted, computer-controlled motor and lights that cycle 3D objects through a raised viewing area. There may be synchronized lights that blink when a 3D object is in view. The movie may comprise an object constructed from inanimate, three dimensional objects that are each slightly different from the one before. These objects may be assembled and attached to a roller chain, with each link of the chain comprising a single object. The movie and chain may be constructed from metal or plastic. During use, one object at a time may be viewed through a hole in the top of the device as the chain moves. This action creates an illusion of a single object that is moving through a range of motions. There may be additional motors with blades that rotate to cover the previous and upcoming objects from view during illumination. The spacing of the objects may vary, and all parts can come in different sizes. The object rate may begin at 17 objects per second, although a faster speed is advisable. The light speed may vary to accommodate the object rate and spacing. The invention may be about 4' high, 2' long and 2' wide. The effect of the invention is that 3D animation may be viewed from all angles without the hassle of glasses or the limitations of pre-determined vantage points. Belts may also be used; however chain is preferred.

Figure 1:
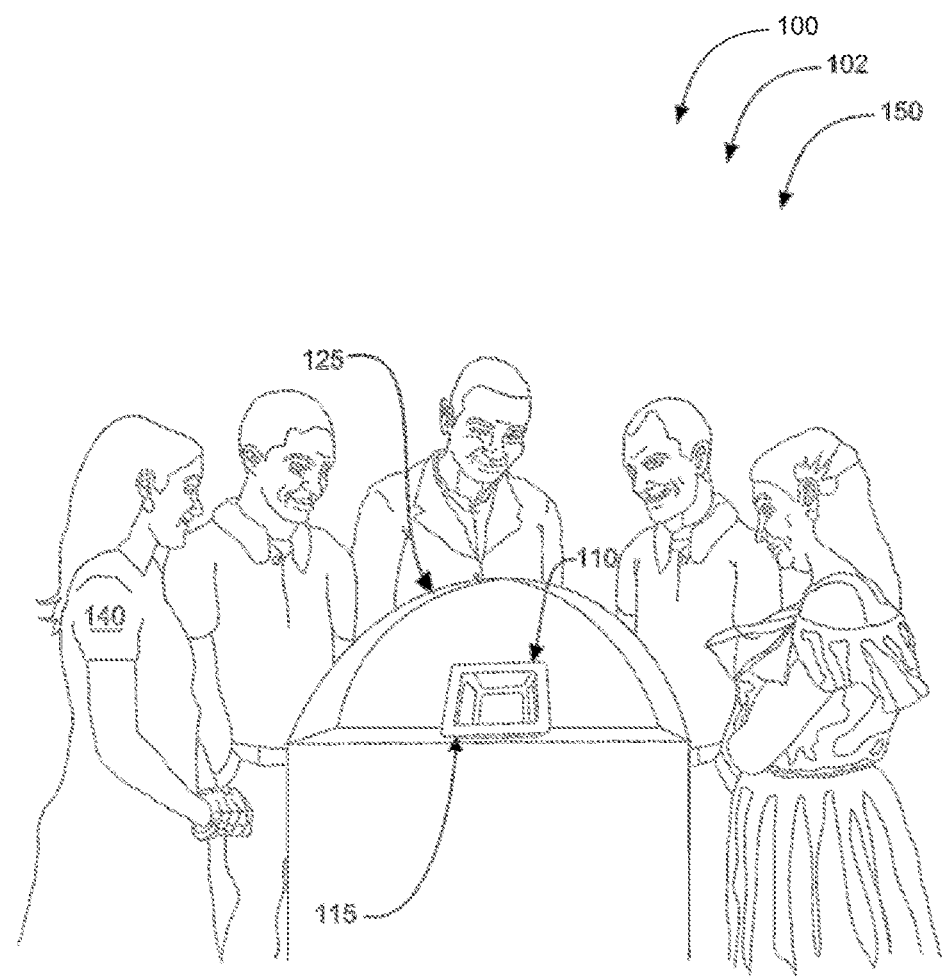
FIG. 1 shows a perspective view illustrating a volumetric movie display system during an 'in-use' condition according to an embodiment of the present invention.

Referring to the drawings by numerals of reference there is shown in FIG. 1, volumetric movie display systems 100 during 'in-use' condition 150 according to an embodiment of the present invention. As shown, volumetric movie display systems 100 may comprise 3D movie display assembly 102 and 3D movie strip 110 working in functional combination to produce 3D motion picture 125. In one embodiment of the present invention, 3D movie display assembly 102 may generally comprise housing 200, first-shaft 202, second-shaft 204, first-bearing 206, second-bearing 208, first-sprocket 210, second-sprocket 212, chain 220, power supply 225, and motor 230.

In continuing to refer to FIG. 1, 3D movie strip 110 is shown comprising plurality of sequentially spaced 3D volumetric objects 115. It should be appreciated that 3D movie strip 110 is able to be viewed by user(s) 140 from a full range of vantage points, thus enabling volumetric movie display systems 100 to be enjoyed from a full range of angles surrounding 3D movie display assembly 102.

Figure 2:
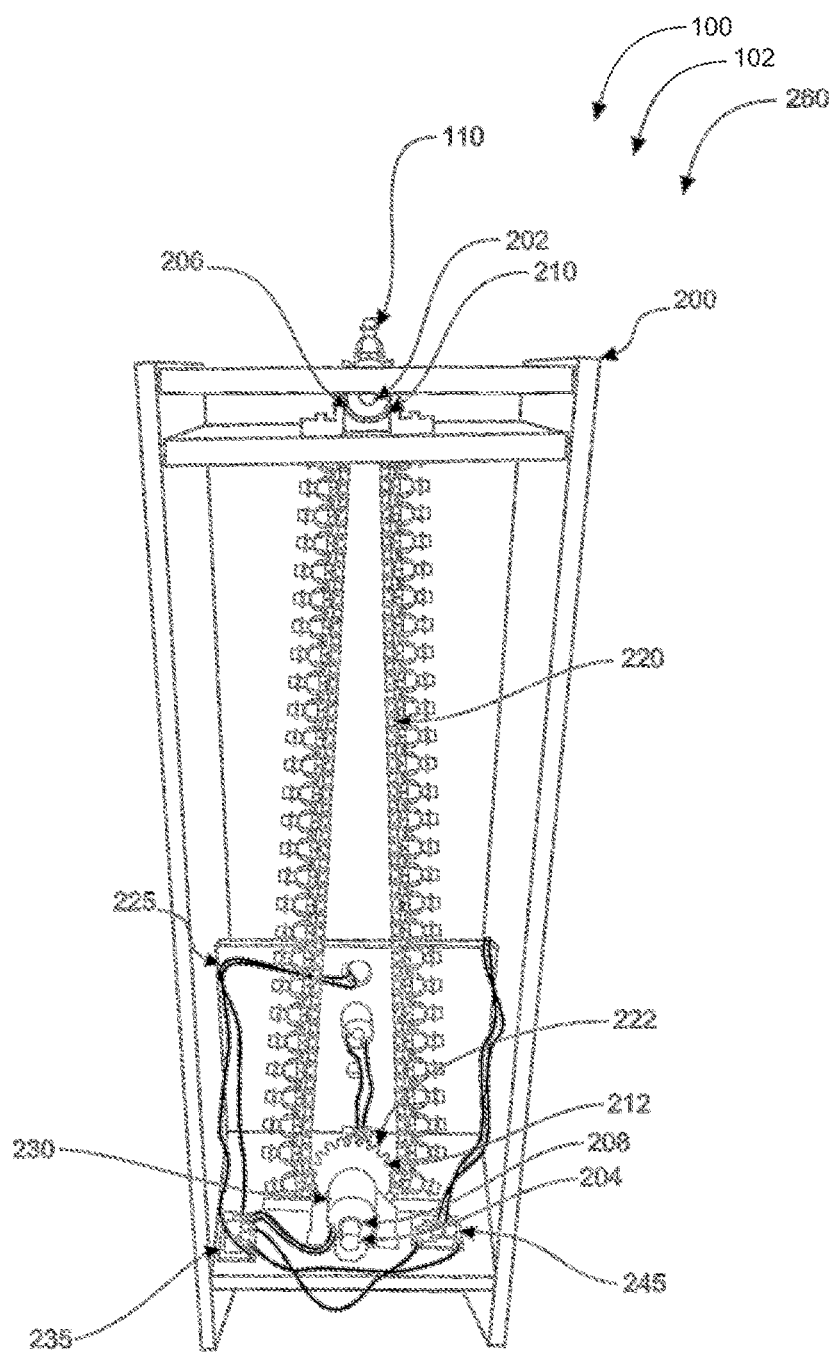
FIG. 2 is a perspective view illustrating a 3D movie display assembly according to an embodiment of the present invention of FIG. 1.

Referring now to FIG. 2 showing a perspective view illustrating 3D movie display assembly 102 according to an embodiment of the present invention of FIG. 1. As shown, 3D movie display assembly 102 may comprise housing 200, first-shaft 202, second-shaft 204, first-bearing 206, second-bearing 208, first-sprocket 210, second-sprocket 212, chain 220, power supply 225, and motor 230. 3D movie strip 110 comprises plurality of sequentially spaced 3D volumetric objects 115, and 3D movie strip 110 is able to be rotated by first-sprocket 210 and second-sprocket 212. It should be noted that 3D volumetric objects 115 may comprise virtually any shape; shapes such as cubes may be used as shown, however it is to be understood that these are used as exemplary means and 3D volumetric objects 115 are not limited to such shapes; other framing means may be used.

First-sprocket 210 and second-sprocket 212 may be mounted on first-shaft 202 and second-shaft 204 via first-bearing 206 and second-bearing 208, respectively. First-shaft 202 and second-shaft 204 may be connected to motor 230. First-bearing 206 may be mounted on first-shaft 202, and second-bearing 208 may be mounted on second-shaft 204. First-sprocket 210 is mounted on first-bearing 206 and second-sprocket 212 is mounted on second-bearing 208. It should be appreciated that first-sprocket 210 is turned by motor 230 causing chain 220 to be rotated such that chain 220 causes second-sprocket 212 to turn to guide chain 220 as it is rotated. A rotation of chain 220 at a 3D movie producing speed may be structured and arranged to make plurality of sequentially spaced 3D volumetric objects 115 of 3D movie strip 110 to appear as 3D motion picture 125.

In still referring to FIG. 2, 3D movie display assembly 102 of volumetric movie display systems 100 may comprise computer processor 235 for controlling motor 230. In one embodiment, chain 220 of 3D movie display assembly 102 may comprise roller chain 224. Volumetric movie display systems 100 roller chain 224 comprises a plurality of links whereby each link of roller chain 224 comprises object 305. 3D movie display assembly 102 may further comprise plurality of lights 260 for illuminating 3D motion picture 125 during 'in-use' condition 150. Plurality of lights 260 may be synchronized such that plurality of lights 260 blinks when 3D volumetric objects 115 are in view. It should be noted that plurality of lights 260 may be added or installed by user 140 above and around 3D movie display assembly 102 for illuminating 3D motion picture 125 during 'in-use' condition 150 of volumetric movie display systems 100. Plurality of lights 260 may blink to a pre-determined strobe.

In continuing to refer to FIG. 2, 3D movie display assembly 102 of volumetric movie display systems 100 may comprise IR sensor 245. IR sensor 245 may comprise a passive infrared sensor (PIR sensor) that measures infrared (IR) light radiating from objects in its field of view. IR sensor 245 is useful for counting plurality of teeth 222 on sprocket 212.

In one embodiment of the present invention, 3D movie display assembly 102 of volumetric movie display systems 100 may alternatively comprise a laser light or a projector for illumination of 3D motion picture 125.

In one embodiment of the present invention, volumetric movie display systems 100 may function in combination with an audio feed that is able to be synced with 3D motion picture 125 for providing sound.

In another embodiment of the present invention, 3D movie display assembly 102 of volumetric movie display systems 100 may comprise a plurality of gears for displaying 3D volumetric objects 115. Furthermore, 3D movie display assembly 102 may comprise a timing belt for displaying 3D volumetric objects 115.

It should be noted and appreciated that there may be many sprockets and shafts, and not limited to just first-shaft 202, second-shaft 204, first-sprocket 210, and second-sprocket 212. In such a manner, user 140 is able to connect 3D movie strip 110 that comprises a user-desired number of 3D volumetric objects 115 for displaying 3D motion picture 125 of lengthier durations.

Figure 3:
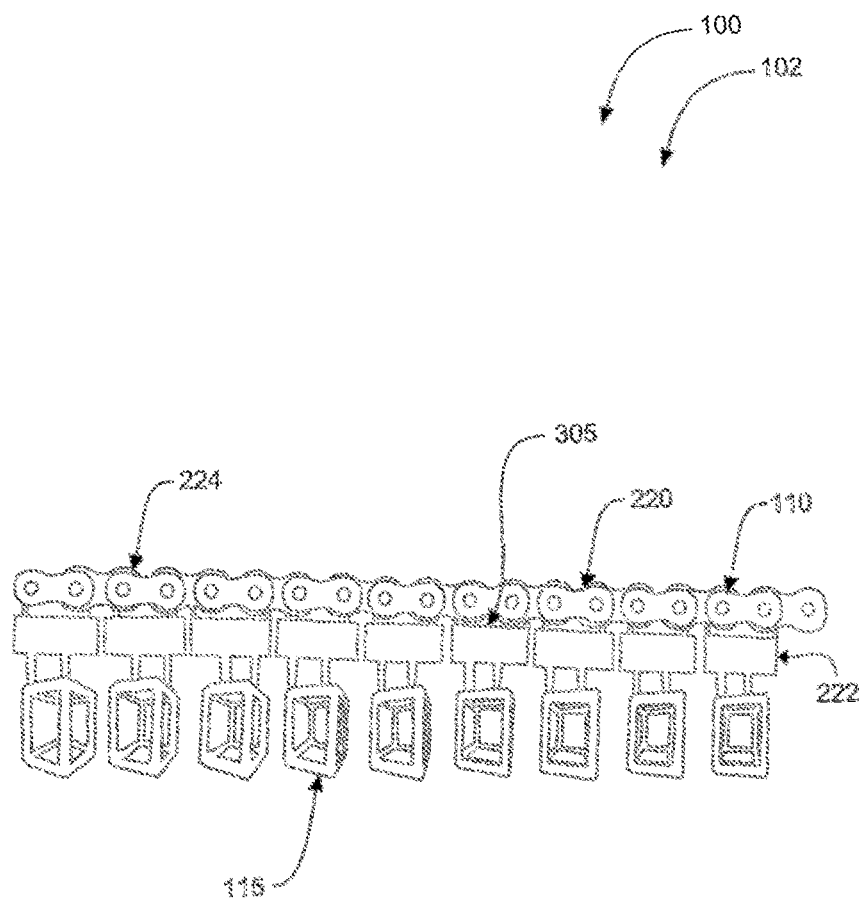
FIG. 3 is a perspective view illustrating a 3D movie strip comprising a plurality of sequentially spaced 3D volumetric objects according to an embodiment of the present invention of FIG. 1.

Referring now to FIG. 3, a perspective view illustrating 3D movie strip 110 comprising a plurality of sequentially spaced 3D volumetric objects 115 according to an embodiment of the present invention of FIG. 1. In one embodiment of the present invention, volumetric movie display systems 100 object rate comprises 12 frames per second. Alternatively, object rate may be greater than 12 objects per second for watching 3D motion picture 125 in fast motion. Alternatively, object rates may be less than 12 objects per second for watching 3D motion picture 125 in slow motion.

Figure 4:
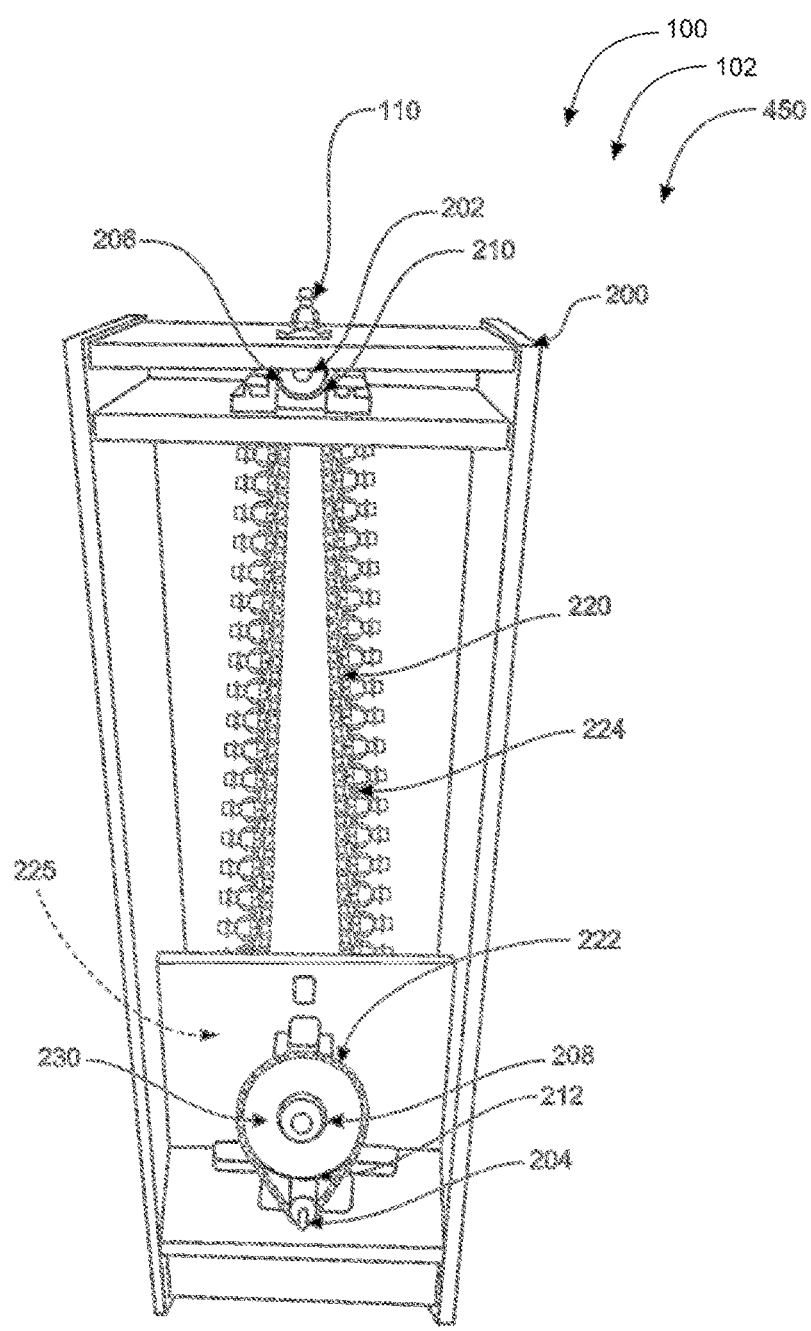
FIG. 4 is a perspective view illustrating how the 3D movie strip is connectable to a first-sprocket of the 3D movie display assembly according to an embodiment of the present invention of FIG. 1.

Referring now to FIG. 4, a perspective view illustrating how 3D movie strip 110 is connectable to first-sprocket 210 of 3D movie display assembly 102 according to an embodiment of the present invention of FIG. 1. First-bearing 206 of 3D movie display assembly 102 may be mounted on first-shaft 202, and second-bearing 208 may be mounted on second-shaft 204. It should be appreciated that first-sprocket 210 is turned by motor 260 causing chain 220 (comprising roller chain 224) to be rotated such that roller chain 224 may cause second-sprocket 212 to turn to guide roller chain 224 as it is rotated. A rotation of chain 220 at a 3D movie producing speed may be structured and arranged to make plurality of sequentially spaced 3D volumetric objects 115 of 3D movie strip 110 to appear as 3D motion picture 125. As may be seen, 3D movie strip 110 is connectable to chain 220 comprising roller chain 224 by inserting object 305 of 3D movie strip 110 to teeth 222 of first-sprocket 210.

Volumetric movie display systems 100 may be sold as a kit comprising the following parts: 3D movie display assembly 102; 3D movie strip 110 comprising plurality of 3D volumetric objects 115; and at least one set of user instructions. The kit has instructions such that functional relationships are detailed in relation to the structure of the invention (such that the invention can be used, maintained, or the like in a preferred manner). Volumetric movie display systems 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color combinations, parts may be sold separately, etc., may be sufficient.

Figure 5:
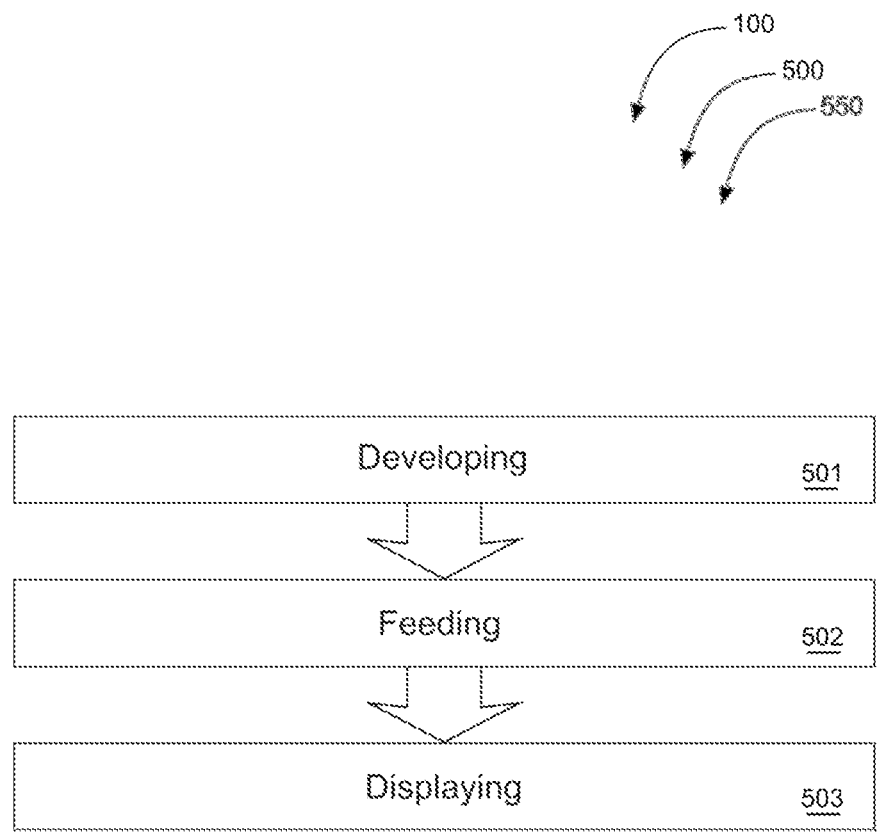
FIG. 5 is a flowchart illustrating a method of use for the volumetric movie display system according to an embodiment of the present invention of FIGS. 1-4.

Referring now to FIG. 5, a flowchart 550 illustrating method of use 500 for volumetric movie display systems 100 according to an embodiment of the present invention of FIGS. 1-4. Method of use 500 of volumetric movie display systems 100 may comprise the steps of: step one 501, developing 3D movie strip 110 comprising plurality of 3D volumetric objects 115; step two 502, feeding 3D movie strip 110 by connecting 3D movie strip 110 to chain 220 of 3D movie display assembly 102; and step three 503, displaying 3D motion picture 125 in three-dimension to be viewed by user 140.

It should be noted that the steps described in the method of use can be carried out in many different orders according to user preference. The use of "step of" should not be interpreted as "step for", in the claims herein and is not intended to invoke the provisions of 35 U.S.C. §112, ¶ 6. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A volumetric movie display system comprising:
   a 3D movie display assembly having;
      a housing;
      a first-shaft;
      a second-shaft;
      a first-bearing;
      a second-bearing;
      at least a first-sprocket;
      at least a second-sprocket;
      a motor;
      a chain; and
      a power supply; and
   at least one 3D movie strip comprising;
      a plurality of sequentially spaced 3D volumetric objects;
   wherein said at least one 3D movie strip is able to be rotated by said first-sprocket and said second-sprocket;
   wherein said first-sprocket and said second-sprocket are mounted on said first-shaft, and said second-shaft, respectively on said first-bearing and said second-bearing;
   wherein said first-shaft and said second-shaft are connected to said motor;
   wherein said first-bearing is mounted on said first-shaft;
   wherein said second-bearing is mounted on said second-shaft;
   wherein said first-sprocket is mounted on said first-bearing;
   wherein said second-sprocket is mounted on said second-bearing;
   wherein said first-sprocket is turned by said motor causing said chain to be rotated;
   wherein said chain rotated by said first-sprocket causes said second-sprocket to turn to guide said chain as it is rotated; and
   wherein a rotation of said chain at a 3D movie producing speed is structured and arranged to make said plurality of sequentially spaced 3D volumetric objects of said at least one 3D movie strip to appear as a 3D motion picture.

2. The volumetric movie display system of claim 1 wherein said 3D movie display assembly comprises a computer processor for controlling said motor.

3. The volumetric movie display system of claim 2 wherein said chain of said 3D movie display assembly comprises a roller chain.

4. The volumetric movie display system of claim 3 wherein said roller chain comprises a plurality of links whereby each said link of said roller chain comprises a single object attached thereto.

5. The volumetric movie display system of claim 4 wherein said 3D movie display assembly comprises a plurality of lights for illumination said 3D motion picture.

6. The volumetric movie display system of claim 5 wherein said plurality of lights are synchronized such that said plurality of lights blink when said 3D volumeric object is in view.

7. The volumetric movie display system of claim 6 wherein said 3D movie display assembly comprises an IR sensor that counts a plurality of teeth on said sprocket.

8. The volumetric movie display system of claim 7 wherein said plurality of lights flashes at a consistent interval that corresponds to a time when said 3D volumetric object is in a projectable position.

9. The volumetric movie display system of claim 8 wherein said 3D movie strip is able to be viewed by said user from a full range of vantage points.

10. The volumetric movie display system of claim 9 wherein said plurality of lights blink to a pre-determined strobe.

11. The volumetric movie display system of claim 10 wherein said 3D movie display assembly comprises at least one laser and alternatively a projector light for illumination said 3D motion picture.

12. The volumetric movie display system of claim 11 wherein an audio feed is able to be synced with said 3D motion picture for providing sound.

13. The volumetric movie display system of claim 12 wherein an object rate comprises 12 objects per second.

14. The volumetric movie display system of claim 12 wherein said object rate is greater than 12 frames per second for watching said 3D motion picture in fast motion.

15. The volumetric movie display system of claim 12 wherein said object rate is less than 12 frames per second for watching said 3D motion picture in slow motion.

16. The volumetric movie display system of claim 12 wherein said 3D movie display assembly comprises a plurality of gears for displaying said 3D volumetric objects.

17. The volumetric movie display system of claim 12 wherein said 3D movie display assembly comprises a timing belt for displaying said 3D volumetric objects.

* * * * *